United States Patent [19]

Moore, Jr.

[11] Patent Number: 5,018,019
[45] Date of Patent: May 21, 1991

[54] METHOD AND APPARATUS FOR IMPROVING SIGNAL TO NOISE RATIO IN A TELECINE MACHINE

[75] Inventor: Leslie G. Moore, Jr., Webster, N.Y.

[73] Assignee: Eastman Kodak Company, Rochester, N.Y.

[21] Appl. No.: 422,342

[22] Filed: Oct. 16, 1989

[51] Int. Cl.⁵ .................. H04N 3/40; H04N 5/253
[52] U.S. Cl. ................... 358/215; 358/214; 358/54; 358/97
[58] Field of Search ............. 358/214, 215, 216, 212, 358/54, 97, 213.24, 213.19, 486

[56] References Cited

U.S. PATENT DOCUMENTS

| | | | |
|---|---|---|---|
| 4,205,337 | 5/1980 | Millward | 358/54 |
| 4,338,634 | 7/1982 | Dillon et al. | 358/214 |
| 4,618,254 | 10/1986 | Therrien et al. | 355/68 |
| 4,623,929 | 11/1986 | Johnson et al. | 358/214 |
| 4,630,120 | 12/1986 | Child | 358/214 |
| 4,736,251 | 5/1988 | Sasaoka | 358/75 |
| 4,743,971 | 5/1988 | Hügli | 358/213.16 |
| 4,934,821 | 6/1990 | Morton | 358/102 |

Primary Examiner—John K. Peng
Assistant Examiner—Safet Metjahic
Attorney, Agent, or Firm—Parkhurst, Wendel & Rossi

[57] ABSTRACT

A method and apparatus is disclosed for operating CCD sensors of a telecine machine at full well potential during a conversion mode of operation and at ½ full well potential during shuttle mode operations. The disclosed method and apparatus optimize the signal-to-noise S/N ratio during the conversion mode of operation.

11 Claims, 2 Drawing Sheets

METHOD AND APPARATUS FOR IMPROVING SIGNAL TO NOISE RATIO IN A TELECINE MACHINE

BACKGROUND OF THE INVENTION

This invention is related to the general field of electronic imaging, and more specifically, to methods and apparatus for producing electronic video signals from a photographic original. The invention is particularly applicable to linear array scanning devices employed in telecine machines.

Telecine machines are used to produce television or video images from photographic film originals. Three basic methods have been developed to implement the film to video conversion. The first method uses a television camera arrangement on which the photographic film is projected. The second method employs the use of a flying spot scanner system in which a raster on the face of a special cathode-ray tube is imaged on the film and received by photomultiplier tubes. The third and most generally preferred method employs the use of a solid-state linear array film scanner to scan the photographic film one line at a time.

A linear array film scanner typically employs a light-sensitive linear charge-coupled sensor device (CCD) that provides a serial output representing a single video line. The photographic film to be transferred is transported between the CCD sensor device and a light source and an optical system is used to focus the photographic image present on the film onto the CCD sensor device. The movement of the photographic film provides the vertical (frame) scan rate and the cycling of the CCD sensor device provides the horizontal (line) scan rate.

Generally, three CCD sensors are provided (red, green and blue) if color conversion is to be accomplished and a beam splitter is provided in the optical system to image the illuminated section of the photographic film onto all three CCD sensors at the same time. A three CCD sensor system is described, for example, in U.S. Pat. No. 4,205,337. Alternatively, a single CCD sensor can be employed as illustrated in U.S. Pat. No. 4,736,251, wherein three CCD line sensors are formed on a common substrate.

The photographic film is driven at a constant speed, generally at either 24, 25 or 30 frames per second (fps) depending on how the film was originated and to which video standard the film is being converted, during the actual film-to-video conversion operation. It is common practice, however, to operate the telecine machine in a "shuttle" mode between frame rates from near zero fps to over 300 fps. The shuttle mode is used to locate a particular starting point or selected portions of the motion picture film that the operator wishes to convert to a video image signal.

In a telecine machine that employs a solidstate sensor as described above, the sensor scan rate will necessarily depend on the running speed of the film to be converted. Varying the speed of the film during shuttle mode operation will therefore result in wide variations in integration time for the solidstate sensor causing changes in picture quality as film speed is varied. For example, at slow film speeds and relatively long integration times, the charge accumulated may reach the saturation level of the photosensitive devices employed in the CCD sensor resulting in an overexposed image. In contrast, the charge accumulated at high film speeds may be insufficient thereby resulting in an image which appears underexposed.

Efforts have been made to address the problems associated with variations in integration time experienced with solid-state telecine machines. For example, U.S. Pat. No. 4,630,120 issued to Childs (incorporated herein by reference) describes a system that employs the use of variable-gain amplifiers to compensate for changes to the magnitude of the output signal from the CCD sensors. The disclosed system generates a compensation signal based on the reciprocal of the sensor scanning period. The use of the variable-gain amplifiers alone, however, does not provide sufficient compensation for wide variations in integration time.

For example, if a system were calibrated with that maximum charge capacity equal to $\frac{1}{2}$ full well at 30 fps, at 24 fps the sensor would reach a charge capacity of $\frac{5}{8}$ full well, and at 15 fps the integration time would be twice that of 30 fps resulting in charge capacity reaching full well. Thus, as the scan rate decreases the integration time must be reduced to prevent saturation. This can be accomplished by reducing the integration time by $\frac{1}{2}$ below 15 fps, resulting in the sensor charge being at $\frac{1}{2}$ full well and rejecting every other scan line via signal processing. This is described in detail in U.S. Pat. No. 4,630,120 as using "dummy" scan lines.

The above-described solution to variations in integration times provides an optimum signal-to-noise (S/N) ratio at 15 fps, i.e., when the sensor is operating at full well, which occurs during shuttle mode operation and not during film-to-video conversion. Thus, the sensor is being operated at less than full well, and consequently not at the optimum S/N ratio, during the actual conversion process. Accordingly, it would be desirable to provide a method and apparatus that compensates for variations in integration time while optimizing the S/N ratio for the sensor during actual film-to-video conversion operations.

SUMMARY OF THE INVENTION

The invention is based on the recognition that optimization of the S/N ratio need only occur during actual film-to-video conversion operations. Thus, the invention provides a method and apparatus for operating the CCD sensors at full well potential during a conversion mode of operation to optimize the S/N ratio. The CCD sensors are operated at $\frac{1}{2}$ full well potential during shuttle mode operations.

In a preferred embodiment of the invention, a telecine machine is provided that includes a film gate; a variable speed film transport mechanism for transporting film through the film gate; a variable output light source; at least one light sensing device; an optical system for passing light generated by the variable output light source through the film gate and focusing the light onto the light sensing device; an input unit for generating a signal indicative of a selected operating mode; and a control unit responsive to the signal to control the operation of the film transport mechanism, the light source and the sensing device, wherein the sensing device is operated at full well potential in a conversion operating mode and at half well potential in a shuttle operating mode.

BRIEF DESCRIPTION OF THE DRAWINGS

With the above as background, reference should now be made to the following detailed description of the preferred embodiments and the accompanying drawings in which.

DETAILED DESCRIPTION OF THE PREFERRED EMBODIMENT(s)

Figure 1:
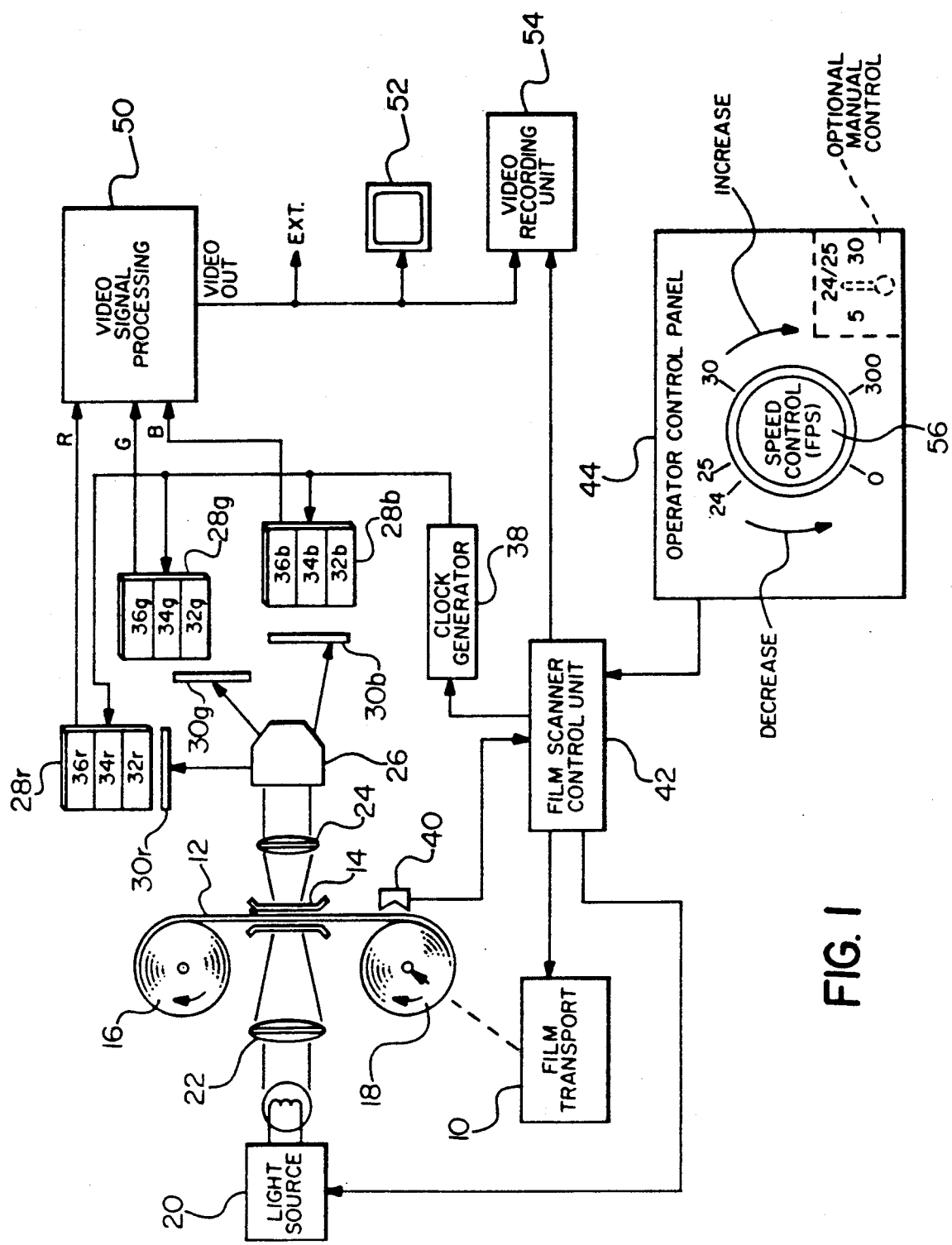
FIG. 1 illustrates a block diagram of a telecine machine incorporating the invention.

Referring now to FIG. 1, a telecine machine in accordance with the invention is shown including a film transport 10 that advances a motion picture film 12 at variable speeds through a film gate 14 from a supply reel 16 to a take-up reel 18. A variable light source 20 generates a light beam that is directed to a line converter 22 and focused upon a linear section of the film 12 in the film gate 14. The light is modulated by the image on the film 12 and is transmitted through an objective lens 24 to a beam splitter 26 that transmits the modulated light to each of three CCD line sensors 28r, 28g, 28b. Red, green and blue filters 30r, 30g, 30b are respectively provided in front of the CCD line sensors 28r, 28g, 30b, so that the output signals generated from the sensors correspond to the red, green and blue components of the modulated light. A film speed sensor 40 is provided to monitor the speed of the film as it passes through the film gate, and supplies a signal indicative thereof to a film scanner control unit 42. The film scanner control unit 42 also receives a signal from an operator control panel 44 which indicates the selected operating mode and transport speed. The film scanner controller 42 in turn supplies a control signal to the film transport 10, a sensor clock generator 38 and the variable light source 20.

Each CCD line sensor 28r, 28g, 28b includes a linear array of active photosites 32r, 32g, 32b, a transfer gate 34r, 34g, 34b and a horizontal output shift register 36r, 36g, 36b. Image charge accumulated in the active photosites of the respective linear arrays is transferred to the respective horizontal output shift registers 36r, 36g, 36b by applying a gate signal to the respective transfer gate 34r, 34g, 34b. The sensor clock 38 provides the gate signal to the transfer gates 34r, 34g, 34b to effect charge transfer. In addition, the sensor clock generator 38 provides a clock signal of predetermined frequency for shifting the respective image signals from the horizontal output shift registers.

The output signals from the CCD sensors are supplied to a video signal processing circuit 50. The video signal processing circuit 50 includes various processing circuits which provide image enhancement, gamma correction, etc. to convert and format the signals received from the sensors to a desired video signal format. The specific details of the video processing will not be discussed, as any desired type of video processing may be employed and would be readily apparent to one of ordinary skill in the art.

The output signal from the video processing circuit is supplied to both a video recorder unit 54, a display monitor 52 and to any other external device desired.

The operator control panel 44 includes a variable transport speed control 56 that is set by the operator to a desired film transport speed. In the illustrated embodiment, the transport speed control 56 is a rotary dial device provided with detent positions at transport speeds associated with a conversion mode of operation, i.e., 24, 25 and 30 fps, and generates a signal at the detent positions which is indicative of a film-to-video conversion mode of operation. The dial may be rotated out of the detent positions in a shuttle mode of operation to indicate either a desired increase or decrease the film transport rate from the set conversion speeds. In such a case, the transport speed control generates a signal indicative of desired speed of operation.

Numerous methods can be used to implement the transport speed control 56 using either analog or digital circuitry. The only requirement for the system is the ability of the scanner control unit 42 to be able to distinguish between a selected conversion mode of operation and a selected shuttle mode of operation based on the signal supplied by the transport speed control 56. Preferably, the transport speed control 56 includes a digital encoder and generates a digital signal or word representative of the position of the rotary dial. Alternatively, the rotary dial can be a potentiometric control device to vary a signal voltage in accordance with the desired transport speed.

The operation of the telecine machine illustrated in FIG. 1 will now be described with reference to a conversion mode of operation and a shuttle mode of operation. In a conversion mode of operation, an operator sets the rotary dial of the transport speed control 56 to one of the standard conversion speeds. The transport speed control 56 supplies a position signal to the scanner control unit 42 which is indicative of the selected speed and therefore is also indicative of the desired mode of operation. In the preferred embodiment illustrated, the scanner control unit 42 compares the digital word supplied by the transport speed control 56 to prestored digital words which are indicative of speeds associated with a conversion mode of operation. A conversion mode is selected if the word received from the transport control matches a prestored word. In such a case, the scanner control unit 42 sends a control signal to the variable light source 20 to control the output thereof so that the CCD sensors 28r, 28g, 28b are operating at full well potential. The scanner control unit 42 also sends a control signal to the film transport 10 to regulate the operating speed of the film transport 10 in accordance with the signal received from the transport speed control 56. The scanner control unit 42 also generates an activation signal to activate the video recording unit 54.

In a shuttle mode of operation, an operator turns the rotary dial of the transport speed control 56 to either increase or decrease the transport speed. The scanner control unit 42 determines that the received data word does not match a prestored conversion mode word and that shuttle mode operation is desired. The scanner control unit 42 deactivates the video recording unit 54 and sends a control signal to the variable light source 20 to cut the light output so that the CCD sensors 28r, 28g, 28b are operated at ½ full well during shuttle mode operation. While the CCD sensors will not be operating at the optimum S/N ratio, this is unimportant during shuttle mode operation as the resulting signal will be sufficient for the purposes of locating desired sections of the photographic film. The S/N ratio need only be optimized when the actual film-to-video conversion is taking place.

Figure 2:
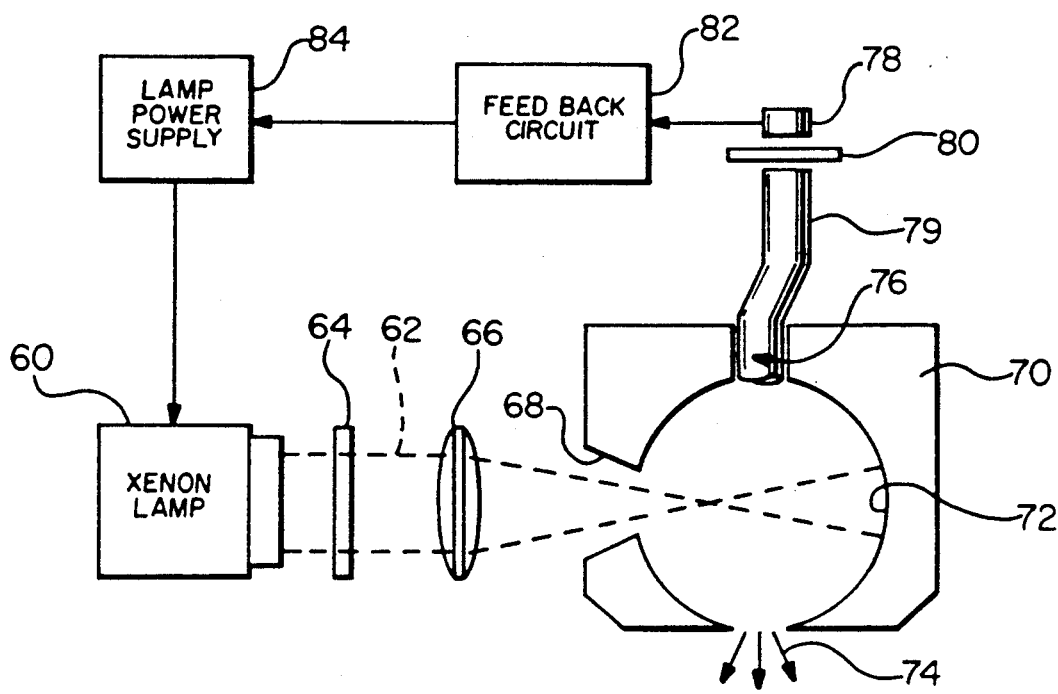
FIG. 2 illustrates a variable light source employed in the telecine machine illustrated in FIG. 1.

FIG. 2 is a schematic block diagram of a apparatus that can be employed as the light source 20. The apparatus is a modified version of source disclosed in commonly assigned and copending U.S. Pat. application Ser. No. 241,637 entitled, "Linear Integrating Cavity Light Source", by Kurtz et al., filed on Sept. 8, 1988. The apparatus includes a Xenon arc lamp 60 (preferably a CERMAX LX 300F Xenon Arc Lamp) that produces a light beam 62. The light beam 62 is spectrally filtered by a filter 64 to remove infrared and ultraviolet radiation, and is focused by a lens 66 onto an input port 68 of a cylindrical integrating cavity 70. The internal surface 72 of the integrating cavity 70 is diffusely reflecting, and a line of light is emitted via an output slit 74.

Since bright light sources such as Xenon arc lamps vary in intensity due to wandering of the plasma in the arc, means are provided for stabilizing the output of the light source. A feedback port 76 is provided in the integrating cavity 70 to remove a sample of the diffuse light, and the light exiting the feedback port 76 is directed to a photosensor 78 through an optical fiber 79. A neutral density filter 80 is optionally placed over the photosensor 78 to control the intensity of the received light. A signal generated by the photosensor 78 is detected in a feedback circuit 82 that generates a control signal to control the lamp power supply 84 (preferably a CERMAX PS300-1 power supply available from ILC Technology, Sunnyvale, Calif.).

Figure 3:
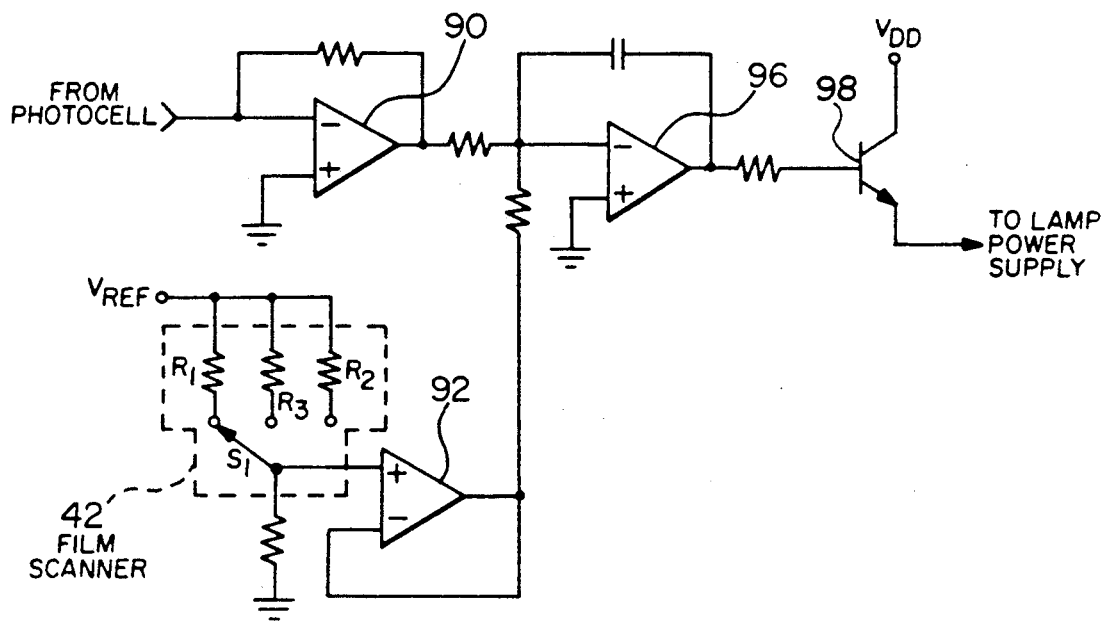
FIG. 3 illustrates a feedback circuit for the variable light source illustrated in FIG. 2.

The feedback circuit 82, schematically illustrated in FIG. 3, includes a first operational 10 amplifier 90 for converting the current signal from the photosensor 78 to a voltage and a second operational amplifier 92 that generates a dc reference voltage for controlling the brightness of the lamp 60. One input to the operational amplifier 92 is coupled to a switching unit S1 that selectively couples the input to a voltage source via one of three resistors R1, R2 and R3 in order to provide three different reference voltages. The switching unit S1 is controlled by the film scanner control unit 42 to select the appropriate reference voltage for 24, 25 or 30 frames per second operation or shuttle mode operation, to control the intensity of the light generated by the lamp 60. The voltage output from the operations amplifier 92 and the voltage from the photosensor 78 supplied by operational amplifier 90 are combined at a summing node and applied to the input of an operation amplifier 96 configured as an integrator. The operational amplifier 96 maintains a constant dc level output voltage and compensates for instantaneous variations in the signal from the photosensor. The output voltage from the operational amplifier 96 is supplied to the base of a transistor 98 operating as a buffer amplifier. The output from the transistor 98 is supplied to the control input of the lamp power supply.

The invention has been described with particular reference to certain preferred embodiments thereof. It will be understood, however, that variations and modifications may be effected within the scope of the appended claims. For example, the circuitry and operation of the disclosed telecine machine can be simplified by making the selection of lamp intensity manual, i.e., the switching unit S1 would simply be a manual switch provided on the operator control panel (shown in phantom in FIG. 1) instead of requiring the film scanner control unit 42 to ascertain the operating mode based on a signal received from the speed control 56.

What is claimed is:

1. An apparatus comprising: a film gate; a variable speed film transport mechanism for transporting film through said film gate; a variable output light source; at least one light sensing device; an optical system for passing light generated by said variable output light source thorugh said film gate and focusing said light onto said light sensing device; an input unit for generating a signal indicative of a selected operating mode and film transport speed associated therewith; and a control until responsive to said signal to control the operation of said film transport mechanism, said variable output light source and said sensing device, wherein the output form said variable output light source is adjusted so that said light sensing device is operated at full well potential in a first operating mode and at half well potential in a second operating mode thereby preventing saturation of said light sensing device.

2. An apparatus as claimed in claim 1, wherein said first operating mode is a conversion mode and said second operating mode is a shuttle mode.

3. An apparatus as claimed in claim 1, further comprising a video processing unit coupled to said sensing device and a display monitor coupled to said video processing unit.

4. An apparatus as claimed in claim 2, further comprising a video recording unit coupled to said video processing unit and said control unit, wherein said control unit activates said video recording unit in said first operating mode.

5. An apparatus comprising:
   a. transport means for transporting film at variable speeds through a film gate;
   b. illumination means for passing light through said film gate and focusing said light onto a light sensing device;
   c. speed selection means for selecting a desired film transport speed and generating an output signal indicative thereof;
   d. control means responsive to said output signal for controlling the operation of said transport means and said illumination means, wherein the output from said illumination means is adjusted so that said light sensing device is operated at full well potential in a first mode of operation at full well potential in a first mode of operation and said light sensing device is operated at half well potential in a second mode of operation thereby preventing saturation of said light sensing device.

6. An apparatus as claimed in claim 5, further comprising signal processing means coupled to said light sensitive sensor for converting signals received therefrom into a desired video signal.

7. An apparatus as claimed in claim 6, further comprising video recording means for recording said video signal when said light sensing device is operated in said first mode of operation.

8. A method of controlling a telecine machine comprising:
   passing light generated form a variable light source through a film gate and focusing said light onto a light sensing device;
   selecting a desired film transport speed and generating an output signal indicative thereof;
   controlling the transportation of film through said film gate in response to said output signal; and
   controlling the intensity of light generated from said variable light source based on the desired film transport speed, wherein said light sensing device is operated at full well potential during a conversion mode of operation and at half well potential in a shuttle mode of operation thereby preventing saturation of said light sensing device.

9. A method as set forth in claim 8, further comprising converting signals generated by said light sensing device into a desired video signal.

10. A method as set forth in claim 8, further comprising recording said video signal when said light sensing device is operated in said first mode of operation.

11. An apparatus comprising: a variable intensity light source; an optical system for passing light generated by said light source through a film gate and focusing said light on at least one light sensitive detector; a video signal processing circuit coupled to said light sensitive detector; a video recording unit coupled to said video signal processing circuit; means for controlling the transportation of film through said film gate at conversion speeds associated with a conversion mode of operation wherein said video recording unit is activated, and at shuttle speeds associated with a shuttle mode of operation wherein said video recording unit is not activated; and means for controlling the intensity of light generated by said light source based on said conversion speeds and shuttle speeds wherein said light sensitive detector is operated at full well in said conversion mode of operation and is operated at half well in said shuttle mode of operation, thereby preventing saturation of said light sensitive detector.

* * * * *

UNITED STATES PATENT AND TRADEMARK OFFICE
CERTIFICATE OF CORRECTION

PATENT NO. : 5,018,019
DATED : May 21, 1991
INVENTOR(S) : Leslie G. Moore, Jr.

It is certified that error appears in the above-identified patent and that said Letters Patent is hereby corrected as shown below:

Column 6, line 6, delete "form" and insert --from--;

Column 6, line 55, delete "form" and insert --from--.

Signed and Sealed this

Sixth Day of October, 1992

*Attest:*

DOUGLAS B. COMER

*Attesting Officer*     *Acting Commissioner of Patents and Trademarks*